(12) United States Patent
Dempsey et al.

(10) Patent No.: US 7,810,866 B2
(45) Date of Patent: Oct. 12, 2010

(54) RECONFIGURABLE TRAVEL TRAILER

(75) Inventors: Thomas M. Dempsey, Cedar Mountain, NC (US); Gregory K. Mundt, Duluth, GA (US); Thomas W. Reeder, Fletcher, NC (US)

(73) Assignee: Sylvansport, LLC, Cedar Mountain, NC (US)

( * ) Notice: Subject to any disclaimer, the term of this patent is extended or adjusted under 35 U.S.C. 154(b) by 354 days.

(21) Appl. No.: 11/890,445

(22) Filed: Aug. 6, 2007

(65) Prior Publication Data

US 2009/0001756 A1    Jan. 1, 2009

Related U.S. Application Data

(60) Provisional application No. 60/946,885, filed on Jun. 28, 2007.

(51) Int. Cl.
*B60P 3/39* (2006.01)
(52) U.S. Cl. .................... 296/173; 296/169
(58) Field of Classification Search .............. 296/173, 296/156, 159, 160, 165, 168, 169, 171; 280/63, 280/656
See application file for complete search history.

(56) References Cited

U.S. PATENT DOCUMENTS

| | | | | | |
|---|---|---|---|---|---|
| 1,422,498 | A | * | 7/1922 | Vint | 296/172 |
| 1,461,574 | A | * | 7/1923 | Meyer | 296/169 |
| 1,477,111 | A | * | 12/1923 | Eaton | 296/174 |
| 1,564,257 | A | * | 12/1925 | Lippman | 296/169 |
| 1,568,895 | A | * | 1/1926 | Lyons | 296/173 |
| 1,596,924 | A | * | 8/1926 | Curtis | 296/173 |
| 1,826,480 | A | * | 10/1931 | Rappich | 296/173 |
| 1,857,081 | A | * | 5/1932 | Clelland | 296/169 |
| 2,076,486 | A | * | 4/1937 | Watt | 296/173 |
| 2,155,582 | A | * | 4/1939 | Bond | 296/169 |
| 2,912,274 | A | * | 11/1959 | Falkner | 296/172 |
| 3,194,251 | A | * | 7/1965 | Pettersen | 296/163 |
| 3,488,085 | A | | 1/1970 | Wallace | |
| 3,489,428 | A | * | 1/1970 | Hunter et al. | 280/765.1 |
| 3,514,150 | A | * | 5/1970 | Wallace | 296/173 |
| 3,608,953 | A | * | 9/1971 | Bernard | 296/169 |
| 3,623,762 | A | * | 11/1971 | Fagan | 135/88.15 |
| 3,625,542 | A | * | 12/1971 | Curtis | 280/766.1 |
| 3,658,375 | A | * | 4/1972 | Bowen | 296/164 |
| 3,697,122 | A | * | 10/1972 | Richards | 296/173 |

(Continued)

OTHER PUBLICATIONS

U.S. Appl. No. 29/281,681 for "Trailer", Dempsey et al., filed Jun. 28, 2007, (13 pages).

(Continued)

*Primary Examiner*—Kiran B. Patel
(74) *Attorney, Agent, or Firm*—J. Bennett Mullinax, LLC

(57) ABSTRACT

A travel trailer is provided. The travel trailer may include first and second bed platforms. The platforms are capable of being positioned in a travel configuration for use during transport of the travel trailer. A camping pod is included that has tent fabric. The camping pod is capable of being positioned in a travel configuration in which the camping pod is located above the first bed platform and the second bed platform when the platforms are positioned in the travel configuration. Also, the first bed platform and second bed platform are capable of being positioned in a camping configuration for use when the tent fabric is positioned to form a tent.

7 Claims, 11 Drawing Sheets

U.S. PATENT DOCUMENTS

| | | | | |
|---|---|---|---|---|
| 3,737,190 | A * | 6/1973 | Smith et al. | 296/159 |
| 3,917,337 | A * | 11/1975 | Couix | 296/169 |
| 4,017,116 | A * | 4/1977 | Hulsey | 296/156 |
| 4,113,301 | A * | 9/1978 | Olmstead | 296/169 |
| 4,187,636 | A * | 2/1980 | Pauly | 446/434 |
| 4,310,195 | A | 1/1982 | Huff | |
| 5,135,278 | A * | 8/1992 | Kauffman et al. | 296/170 |
| 5,211,413 | A * | 5/1993 | Williams et al. | 280/149.2 |
| 5,449,014 | A * | 9/1995 | Yan-ho | 135/95 |
| 5,505,515 | A * | 4/1996 | Turner | 296/173 |
| 5,558,392 | A * | 9/1996 | Young | 296/157 |
| 5,921,616 | A * | 7/1999 | Hall et al. | 296/168 |
| 5,979,972 | A * | 11/1999 | Gehman | 296/173 |
| 6,017,081 | A * | 1/2000 | Colby | 296/173 |
| 6,135,526 | A * | 10/2000 | Reckner, Jr. | 296/37.13 |
| 6,203,097 | B1 * | 3/2001 | Podgorney | 296/170 |
| 6,206,456 | B1 * | 3/2001 | Steury et al. | 296/173 |
| 6,217,106 | B1 * | 4/2001 | Reckner, Jr. | 296/173 |
| 6,283,536 | B1 * | 9/2001 | Muzyka et al. | 296/165 |
| 6,712,414 | B2 * | 3/2004 | Morrow | 296/26.01 |
| 6,722,726 | B1 * | 4/2004 | Parmer | 296/157 |
| 7,014,238 | B2 * | 3/2006 | Gonzalez | 296/26.05 |
| 7,017,975 | B2 * | 3/2006 | Parmer | 296/157 |
| 7,032,956 | B2 | 4/2006 | Gehman et al. | |
| 7,165,779 | B2 | 1/2007 | Badger et al. | |
| 7,178,857 | B2 * | 2/2007 | Williams | 296/173 |
| 7,248,843 | B2 | 7/2007 | Lambright | |
| 7,322,637 | B2 * | 1/2008 | Smith | 296/173 |
| 7,380,867 | B2 * | 6/2008 | Waas | 296/169 |
| 2005/0247747 | A1 * | 11/2005 | Henry et al. | 224/401 |
| 2006/0208462 | A1 * | 9/2006 | Spence | 280/656 |
| 2007/0125410 | A1 * | 6/2007 | Williams | 135/136 |
| 2008/0122197 | A1 * | 5/2008 | Spence | 280/400 |

OTHER PUBLICATIONS

U.S. Appl. No. 29/281,682 for "Trailer", Dempsey et al., filed Jun. 28, 2007, (13 pages).

U.S. Appl. No. 29/281,685 for "Trailer", Dempsey et al., filed Jun. 28, 2007, (13 pages).

Jumping Jack Trailers; Web site print outs from www.jumpingjacktrailers.com; visited Oct. 29, 2008; copyright 2008 Jumping Jack Trailers; (4 pages).

Goshen Stamping Co. Inc.; Web site print outs from www.goshenstamping.com; visited Oct. 29, 2008; copyright Goshen Stamping Co. Inc.; (4 pages).

International Search Report and Written Opinion of the International Searching Authority; International Application No. PCT/US2008/007997; mailing date Oct. 2, 2008; (8 pages).

United States Patent and Trademark Office; Notice of Allowability from U.S. Appl. No. 12/215,358; mailed Apr. 23, 2010; Alexandria, virginia; pp. 1-3; (3 pages).

* cited by examiner

RECONFIGURABLE TRAVEL TRAILER

CROSS REFERENCE TO RELATED APPLICATION

This application claims the benefit of U.S. Application Ser. No. 60/946,885 filed on Jun. 28, 2007 and entitled, "Reconfigurable Vehicle." U.S. Application Ser. No. 60/946,885 is incorporated by reference herein in its entirety for all purposes.

FIELD OF THE INVENTION

The present invention relates generally to travel trailers. More particularly, the present application involves a travel trailer that can be towed in a travel configuration and then converted into a transport configuration for use in transporting an object. The travel trailer can also be converted into a camping configuration in which a tent is formed for use when camping.

BACKGROUND

Travel trailers are available in many types, shapes and sizes, and are typically dedicated for a single purpose. Trailers with flat beds are used for hauling cargo from building materials to furniture. They are generally topless and suited with a perimeter fence, or completely closed with an access door to retain their cargo. Trailers equipped with a flat bed or rails are normally used for transport of recreational vehicles such as all terrain vehicles, motorcycles, watercraft, bicycles or the like. There are trailers outfitted with camper modules, some of which, while incapable of carrying any substantial load, are capable of being converted from a transport trailer to a camper. A further division or class of camper trailer is the pop-up tent camper. These camper trailers are generally constructed of mild steel panels that can be articulated to a vertically expanded position, or popped up, and in combination with an internal tent fabric that acts in concert with the steel panels, reconfigures into a camper environment. Due to a general lack of applied engineering techniques, material selection such as mild steel and multiple gussets for structural stability causes the finished product to be overly weighty and cumbersome.

Lack of adaptability of travel trailers may be problematic if a user wishes to carry an object, such as an all terrain vehicle or a motorcycle, along with a camper. In these instances, one such option may be to use a truck for the tow vehicle that has a truck bed capable of accommodating the desired object. Further, if there are more than two passengers, the trip necessitates the use of a truck with an extended cab to provide greater passenger capacity. With regard to rafting, kayaking or other aquatic activities where there is an embarkation point and a debarkation point, a transport vehicle may be desirable at journeys end for return to the origination point. A travel trailer that allows one to trailer a light motor vehicle to the take out point, drop off the transportation, and return to the start point for a river experience without worry or concern over transportation arrangements may be desirable.

Some travel trailers may also be manufactured so as to be price competitive with little or no regard to curb weight. These types of travel trailers are fabricated for the most part, from less expensive materials, such as off-the-shelf mild steel, as opposed to proprietary custom shapes of more expensive non-corrosive lighter materials like aluminum. Any perceived savings from the initial purchase is quickly vanquished; initially by the requirement of a tow vehicle with a suitable tow package. A tow package, which generally consists of a heavier duty transmission, frame and suspension, can increase the expenditure for the prime mover by many hundreds, if not thousands of dollars. Use of a motorcycle as a tow vehicle is not an option. Additionally, this increased weight, for the trailer and the tow vehicle, adversely affects the miles per gallon of fuel, again increasing the cost of the camping experience. Often, after detaching the trailer from the hitch, it is desirable to reposition the trailer and roll it manually to a more desirable location. Depending on terrain and topography, this operation may require more than one person.

Trailers built expressly for towing loads, especially in the form of wheeled vehicles, may be suited with a tilt capacity, or come with a ramp for on or offloading cargo while the trailer is still attached to the tow vehicle. Camper trailers are not intended to carry vehicles within and therefore are not available with a tilt option. Further, pop-up tent campers which unfold to provide sleeping surfaces do so by expanding forward and backward. As such, camper trailers may need to be removed from the towing vehicle in order to be tilted or to expand in order to construct sleeping and living quarters.

With regard to pop-up tent campers, the upper structure is not typically suited to support or carry a load. Carrying additional cargo may necessitate other transport capabilities for which the pop-up camper is not structurally suited to accommodate. One common answer for this problem is attachment of a roof rack for such cargo as kayaks or light articles, which must be placed atop the towing vehicle. This placement puts the cargo out of the driver's sight casting doubt and concern as to how securely the cargo is attached, especially at highway speeds. This high placement atop the vehicle causes additional problems in handling, due to a raised center of gravity coupled with wind resistance, which adversely affects the control and steering characteristics of the tow vehicle. A further disadvantage of this high placement is the difficulty of on or offloading the cargo from an uncomfortable lifting height.

As such, there remains room for variation and improvement within the art.

SUMMARY

Various features and advantages of the invention will be set forth in part in the following description, or may be obvious from the description, or may be learned from practice of the invention.

One aspect of one exemplary embodiment includes a travel trailer that has a first bed platform and a second bed platform. The first bed platform and second bed platform are capable of being positioned in a travel configuration for use during transport of the travel trailer. A camping pod is included that has tent fabric. The camping pod is capable of being positioned in a travel configuration in which the camping pod is located above the first bed platform and the second bed platform when the platforms are positioned in the travel configuration. Also, the first bed platform and second bed platform are capable of being positioned in a camping configuration for use when the tent fabric is positioned to form a tent.

Another aspect of a further exemplary embodiment is found in a travel trailer as immediately discussed that has a floor. The first bed platform and second bed platform are capable of being positioned in a transport configuration for use in transporting an object during transport of the travel trailer. Also, the camping pod is vertically moved away from the floor during reconfiguration from the travel configuration to the transport configuration.

A further aspect of an additional exemplary embodiment resides in a travel trailer as previously mentioned in which the first bed platform and second bed platform are capable of being positioned in a transport configuration for use in transporting an object during transport of the travel trailer. The first bed platform and second bed platform overlay one another when in the travel configuration. The first bed platform and second bed platform are parallel to one another when in the transport configuration. The first bed platform and second bed platform lie in the same plane when in the camping configuration.

Another aspect of an additional exemplary embodiment is found in a travel trailer that has a floor and a frame. A hitch is included and is configured for attachment to a vehicle. A hinge connection is also included and is configured to allow the angular orientation between the floor and the hitch to change in order to assist in placing an object onto the floor for transport with the travel trailer. Tent fabric is present and is capable of being positioned so as to form a tent. The tent fabric is at least partially supported by the frame.

An additional aspect of yet another exemplary embodiment resides in a travel trailer as immediately stated in which the hinge connection has a damper for use in controlling a rate of angular change between the floor and the hitch when the angular orientation between the floor and the hitch is changed.

Another aspect of a further exemplary embodiment includes a travel trailer as mentioned prior in which the frame has a yoke. The hinge connection is a pin that pivotally attaches the yoke to the hitch.

An additional aspect of another exemplary embodiment resides in a travel trailer as discussed above that further has a camping pod that is configured for holding the tent fabric. The camping pod is positionable with respect to the floor so that the camping pod is capable of being positioned closer to and farther from the floor. The camping pod is capable of being opened in order to position the tent fabric so as to form the tent.

One aspect of one exemplary embodiment exists in a travel trailer that has a floor that at least partially defines a transport area for use in transporting an object during transport of the travel trailer. A camping pod is included that has tent fabric. The camping pod is located above the transport area during transporting of the object during transport of the travel trailer. The tent fabric of the camping pod is capable of being positioned to form a tent.

Another aspect of a further exemplary embodiment is provided in a travel trailer as immediately discussed in which the camping pod has a clamshell configuration. The camping pod is capable of being opened so that a portion of the camping pod forms a front wall of the tent when the tent fabric is positioned to form the tent.

An additional aspect of yet another exemplary embodiment resides in a travel trailer as previously mentioned in which the camping pod has a travel configuration. In the travel configuration the camping pod forms a seal in order to prevent rain from entering the camping pod during transport of the travel trailer. The camping pod also has a camping configuration in which the seal is opened in order to form a vent for providing air flow to and from an interior of the tent when the tent fabric is positioned to form the tent.

A further aspect of an additional exemplary embodiment includes a travel trailer as mentioned prior that further has a hitch that is configured for attachment to a vehicle. A hinge connection is present and is configured to allow the angular orientation between the floor and the hitch to change in order to assist in placing the object into the transport area.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
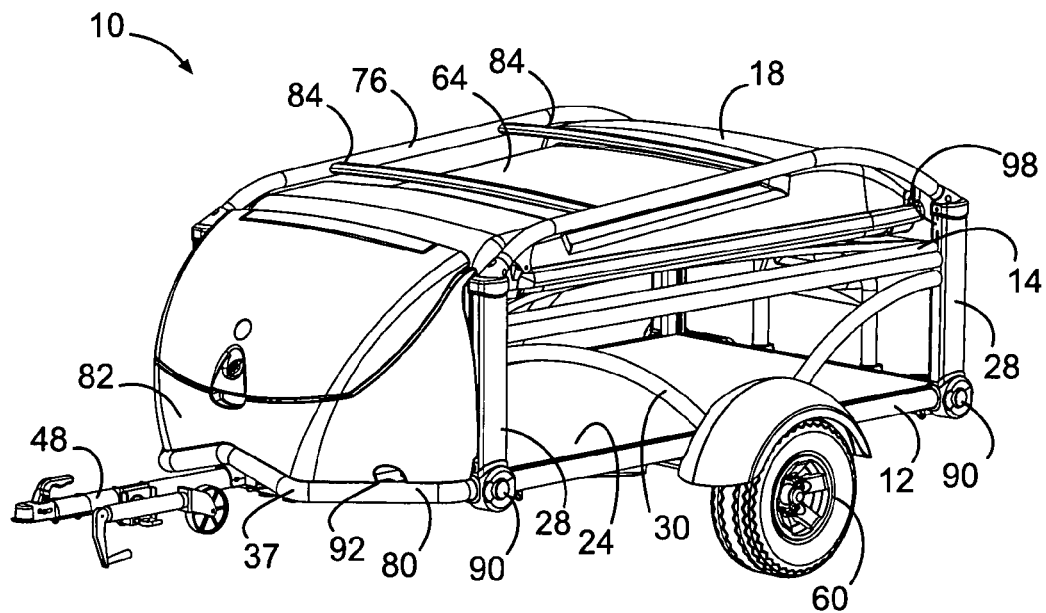
FIG. 1 is a perspective view of a travel trailer in a travel configuration in accordance with one exemplary embodiment.
Figure 2:
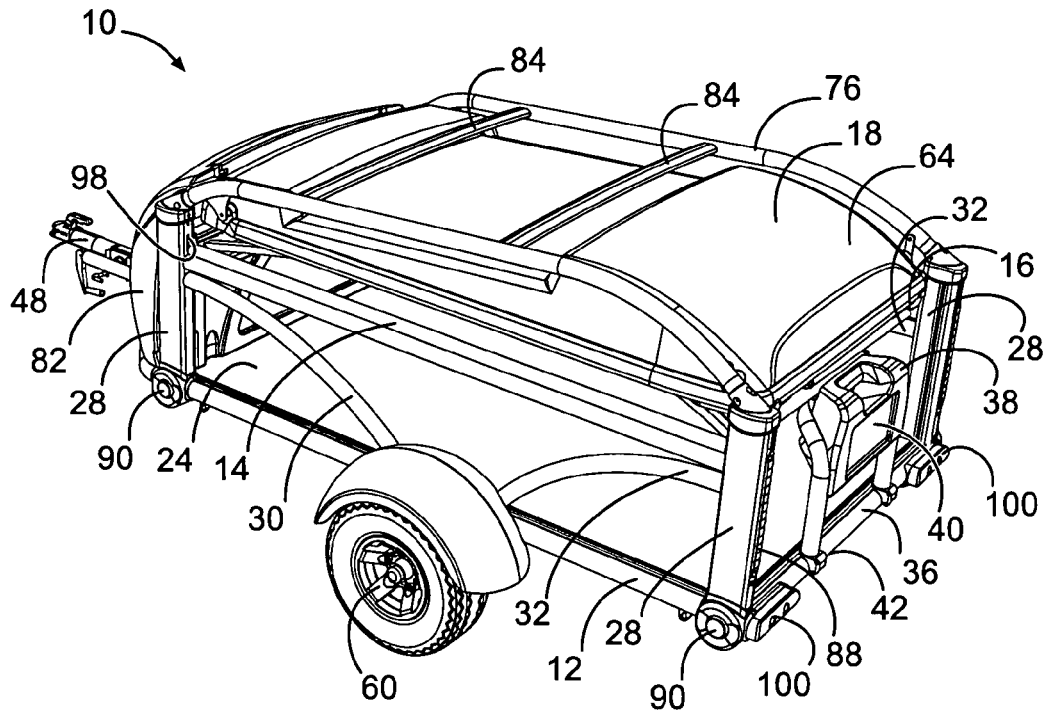
FIG. 2 is a back perspective view of the travel trailer of FIG. 1.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a travel trailer 10 that can be used for camping and for transporting objects. In accordance with one exemplary embodiment, the travel trailer 10 can be placed into a travel configuration for transport by a vehicle to a desired location. Additionally, the travel trailer 10 can be converted into a transport configuration in which it becomes capable of transporting an object 58 such as an all terrain vehicle. In certain embodiments the travel trailer 10 can be provided with a hinge connection 50 in order to allow a portion of the travel trailer 10 to tilt so as to more easily load and unload objects 58. The travel trailer 10 may also be placed into a camping configuration in which a tent 22 is formed on the travel trailer 10 for shelter during camping. The travel trailer 10 can be constructed to be relatively lightweight with a low center of gravity to provide stability during transport and reduce wind resistance to conserve gas mileage and improve handling.

One exemplary embodiment of the travel trailer 10 is shown in FIG. 1. Here, the travel trailer 10 is shown in a travel configuration in which it is positioned in order to be transported by a vehicle (not shown) to a desired location. The travel trailer 10 can be sized and configured so that it is capable of being transported by a variety of vehicles such as trucks, sport utility vehicles, cars and motorcycles. The travel trailer 10 includes a hitch 48 for attachment to a tow ball of a vehicle for transport. Other forms of engagement between the vehicle and travel trailer 10 are also possible. For example, the travel trailer 10 can have a hitch 48 that is inserted into a trailer hitch receive of a vehicle, or the travel trailer 10 may be chained to or otherwise secured to the transporting vehicle.

FIGS. 2 through 6 are various views of the travel trailer 10 of FIG. 1 in the travel configuration. The travel trailer 10 has a frame 12 that includes a front portion 80 that supports a front storage box 82. The front storage box 82 has a cover that can be opened in order to store items therein and remove items therefrom. A locking type hinge may be incorporated into the front storage box 82. The front storage box 82 is lockable and can be insulated in order to prevent heat transfer to or from items housed within. A drain plug can be provided in the bottom of the front storage box 82 in order to drain water therefrom.

The frame 12 supports a floor 24 that has a generally rectangular shape. The floor 24 can be a solid component or may be a grate or other non-solid member. The frame 12 has vertical corner posts 28 located generally at the four corners of the floor 24. The vertical corner posts 28 can be made of extruded aluminum in accordance with one exemplary embodiment. The frame 12 also has a first side frame component 30 and a second side frame component 32. The side frame components 30 and 32 are made of an open framework so that wind resistance is reduced during transport of the travel trailer 10. Portions of the side frame components 30 and 32 are generally semi-circular in shape and extend generally between the wheels 60 and the vertical corner posts 28.

Figure 3:
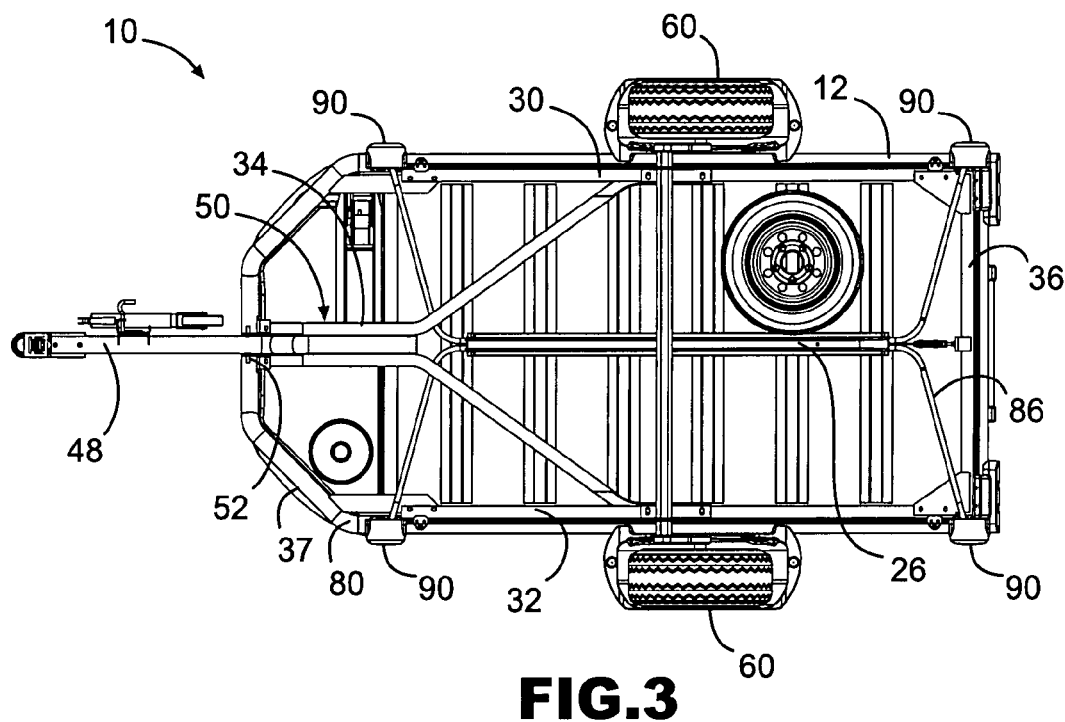
FIG. 3 is a bottom view of the travel trailer of FIG. 1.
Figure 4:
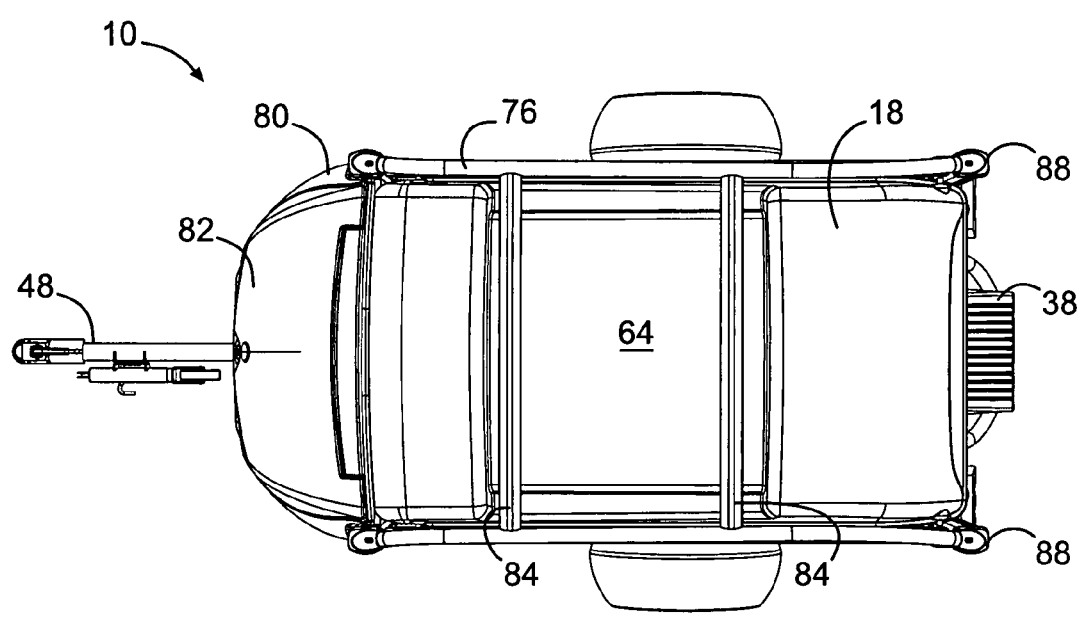
FIG. 4 is a top view of the travel trailer of FIG. 1.
Figure 5:
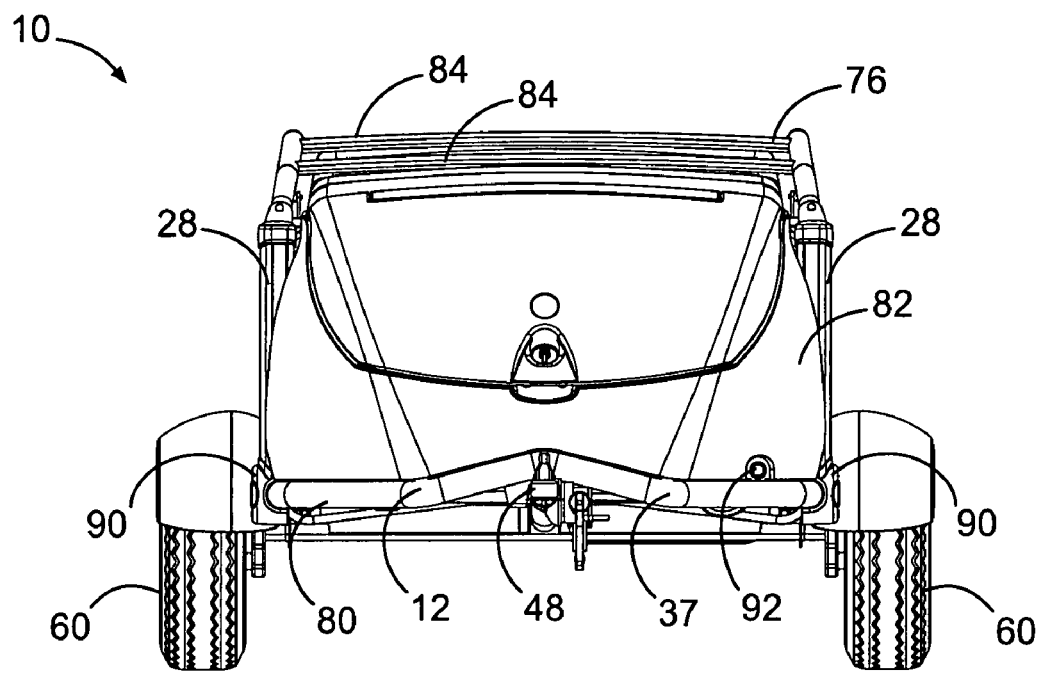
FIG. 5 is a front view of the travel trailer of FIG. 1.
Figure 6:
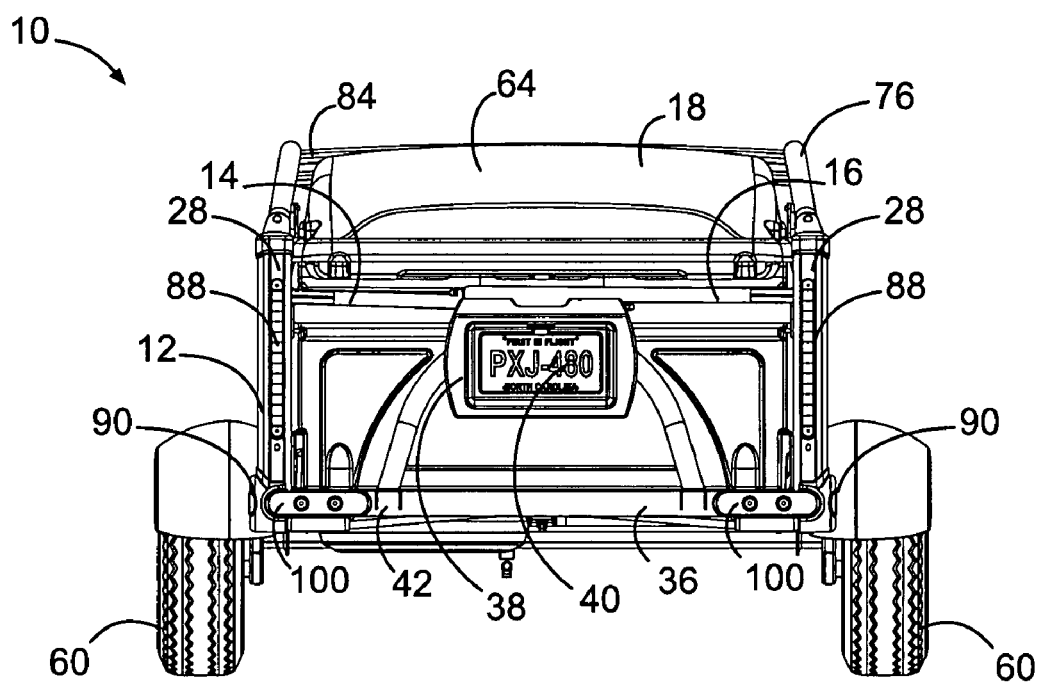
FIG. 6 is a back view of the travel trailer of FIG. 1.

With reference to FIG. 3, the frame 12 has a yoke 34 that is attached to the hitch 48 by way of a hinge connection 50. A pin 52 can be present in the hinge connection 50 in order to lock the hinge connection 50 so that the hitch 48 does not rotate with respect to the yoke 34. When locked the hitch 48 extends generally in the forward/backward direction of the travel trailer 10. The yoke 34 has ends that are received within channels formed by the first and second side frame components 30 and 32. The ends of yoke 34 can be bolted, welded or otherwise attached to the first and second side frame components 30 and 32 in order to strengthen and tie the frame 12 together.

Referring now to FIGS. 1 through 6, a first bed platform 14 is pivotally attached to vertical corner posts 28 of the first side frame component 30. In a similar manner, a second bed platform 16 is pivotally attached to vertical corner posts 28 of the second side frame component 32. The first and second bed platforms 14 and 16 are positioned so as to be folded on top of one another when the travel trailer 10 is placed into the travel configuration. In this regard, the pivot connection between the bed platforms 14, 16 and the side frame components 30 and 32 can be made so that the bed platforms 14, 16 pivot to a certain limit and are then stopped. Additionally or alternatively, one or both of the side frame components 30, 32 can have a lip or other portion onto which the bed platforms 14, 16 rest so that they can be properly positioned in the travel configuration.

The travel trailer 10 also has a camping pod 18 that is supported by a rack 76 that rests on top of the vertical corner posts 28 in the travel configuration. The camping pod 18 can be molded and is made of plastic in accordance with one exemplary embodiment. The camping pod 18 can have an upper surface that is aerodynamically shaped in order to reduce wind resistance during transport of the travel trailer 10. As shown with reference to FIGS. 1 to 6, the travel trailer 10 can be placed into a travel configuration so that it has a relatively compact size and a low height. This arrangement assists in reducing wind resistance during transport and also affords the driver a more unobstructed rear view from the towing vehicle. The rack 76 also includes one or more cross-members 84 that stretch essentially between both sides of the travel trailer 10. The cross-members 84 can be used to support objects such as kayaks, bicycles or skis. The reduced height of the travel trailer 10 thus allows objects to be placed onto the rack 76 and transported in the travel configuration so that the operator of the towing vehicle can view the transported objects in the rear view mirror. Observation of the transported objects may be more desirable to the driver as one will have more security knowing that the object is properly positioned as opposed to the situation in which the object is above the line of sight of the driver and thus hidden from view. As such, the travel trailer 10 is capable of transporting objects when in the travel configuration.

The frame 12 also has a rear cross-member 36 located generally at the back end of the travel trailer 10. The rear cross-member 36 spans the first and second side frame components 30 and 32. The rear cross-member 36 may be made of aluminum and may be formed through extrusion and have an outer surface that is at least partially curved. Connecting members 100 can be used to attach the first and second side frame components 30 and 32 to the rear cross-member 36. The first side frame component 30 can have a lower portion that has a cross-section with internal grooves into which a correspondingly grooved portion of the connecting member 100 can be engaged. The connecting member 100 can be bolted or otherwise secured to the rear cross-member 36 in order to effect or help effect an attachment between the first side frame component 30 and the rear cross-member 36. A second connecting member 100 can be used in a similar manner to help attach the second side frame component 32 and the rear cross-member 36.

A step 38 is mounted onto the rear cross-member 36 by way of a detachable pivot connection 42. The step 38 carries a license plate 40 that is oriented into a display position when the travel trailer is in the travel configuration. The step 38 may be held in the orientation shown in FIGS. 1 through 6 in a variety of manners. For example, the detachable pivot connection 42 may be strong enough to hold the step 38 in the illustrated position, or a pin or other latching member can be used to secure the step 38 to a portion of the frame 12 or rack 76 in order to fix the position of the step 38 as shown.

The travel trailer 10 can be fitted with a variety of light markers in order to increase its visibility and to comply with various Department of Transportation laws. The vertical corner posts 28 can be formed with a channel that extends in the vertical direction of the travel trailer 10. A series of rear light markers 88 can be installed in the channel of the vertical corner posts 28 in order to illuminate the travel trailer 10 and to alert other drivers that the brakes to the towing vehicle are being applied. The rear light markers 88 can also be used to indicate left and right hand turns of the towing vehicle. A plurality of side light markers 90 can be housed within a plastic mounting piece and positioned on the frame 12 at locations essentially below the vertical corner posts 28.

Figure 7:
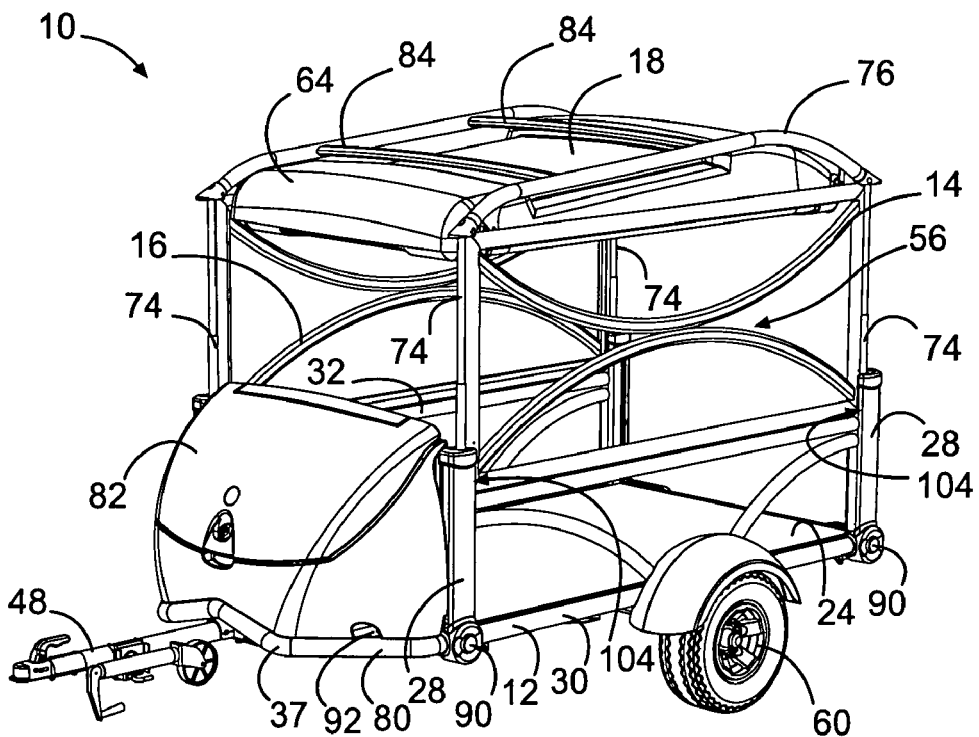
FIG. 7 is a perspective view of a travel trailer in a transport configuration in accordance with one exemplary embodiment.
Figure 8:
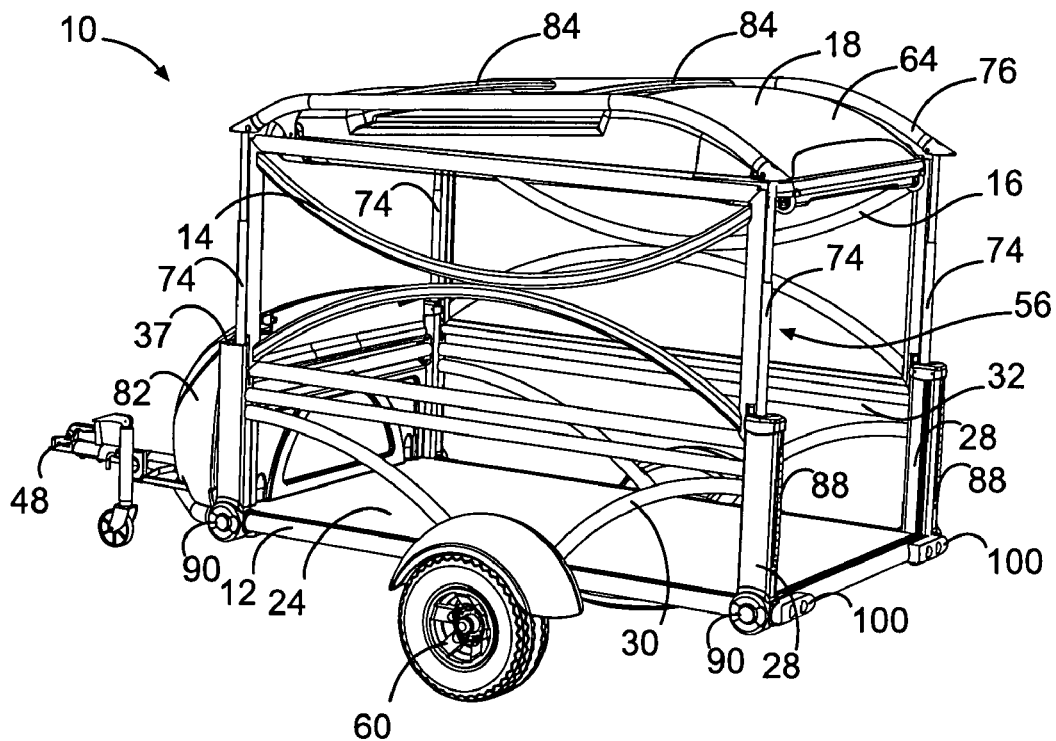
FIG. 8 is a back perspective view of the travel trailer of FIG. 7.

FIGS. 7 and 8 show the travel trailer 10 reconfigured from the travel configuration into a transport configuration. In the transport configuration, a transport area 56 is defined in the travel trailer 10 into which any variety of objects 58 can be placed for transport. The frame 12 supports a floor 24 onto which the objects 58 can be placed. The floor 24 can be a grate or can be a solid piece in accordance with various exemplary embodiments. The camping pod 18 is located above the transport area 56 when the travel trailer 10 is placed into the transport configuration. The camping pod 18 contains tent fabric 20 and is of a generally light weight so that the travel trailer 10 will still maintain a low center of gravity and will resist becoming unstable and tipping over when placed into the transport configuration with proper loading of the transport area 56. Additionally, the positioning of the camping pod 18 above the axle of wheels 60 may provide for greater stability of the travel trailer 10 than in situations in which the camping pod 18 is located in the front of the travel trailer 10 or in the rear of the travel trailer 10.

In order to convert the travel trailer 10 from the travel configuration into the transport configuration, the camping pod 18 is elevated in the vertical direction away from the floor 24. Although a variety of means may be employed in order to lift the camping pod 18, a lifting mechanism 26 is used in the exemplary embodiment shown. Referring back to FIG. 5, the lifting mechanism 26 includes a socket 92. A tool (not shown) can be stored in the front storage box 82 and can be removed therefrom when actuation of the lifting mechanism 26 is desired. The tool can be loosely stored in the front storage box 82 or may be placed into a molded retaining recess formed in the front storage box 82. The user can insert the tool into the socket 92 and rotate the tool therein in order to generate rotational movement in the lifting mechanism 26. FIG. 3 shows a transmission 86 of the lifting mechanism 26 that is used to transfer rotational motion of the socket 92.

Figure 9:
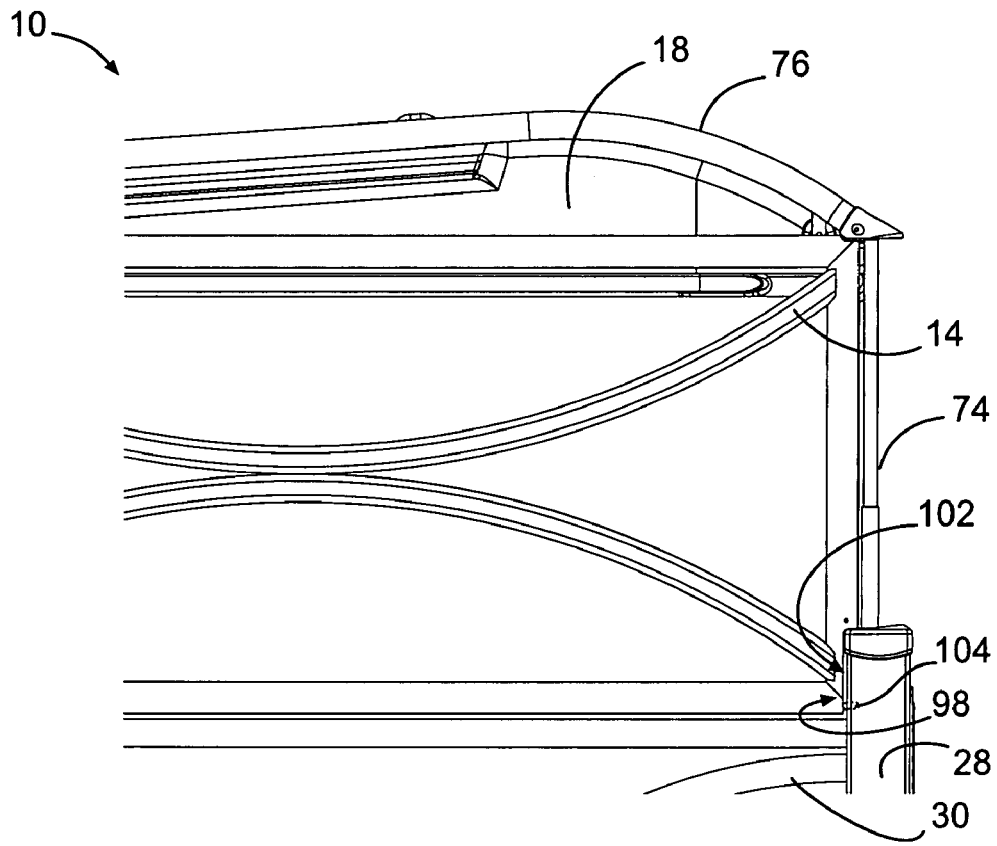
FIG. 9 is a detailed side view of the travel trailer of FIG. 7 showing the interaction between a bed platform and a telescoping member.

Referring now to FIGS. 7 and 8, the telescoping members 74 extend through transmission of motion from the transmission 86 of the lifting mechanism 26. The telescoping members 74 extend from the vertical corner posts 28 in a generally linear direction away from the floor 24. The top of the telescoping members 74 engage the rack 76 and thus cause the rack 76 and the attached camping pod 18 to raise when the telescoping members 74 are extended. Next, the user may unfold the first bed platform 14 so that it achieves an essentially vertical orientation. The vertical corner posts 28 that support the first bed platform 14 have slots 98, visible in FIG. 2, through which pins 104 extend from the first bed platform 14 into the vertical corner posts 28. The pins 104 are shown in the detailed, side view of the travel trailer 10 in FIG. 9. The arrangement is such that the first bed platform 14 can be moved linearly upwards along the slots 98 and then rotated into the vertical orientation shown. A cut-out portion 102 is defined by the first bed platform 14 to provide clearance to allow the first bed platform 14 to rotate around the vertical corner posts 28. Once the first bed platform 14 is oriented into a vertical position, it is lowered downward along slots 98 so that a portion of the first bed platform 14 rests on top of the vertical corner posts 28 as shown in FIG. 9. In this regard, a recessed area or a pin and hole arrangement can be used in order to secure the first bed platform 14 onto the vertical corner posts 28 in the vertical orientation.

The lifting mechanism 26 can then be actuated so that the telescoping members 74 are lowered thus causing the rack 76 to be moved down onto the top of the first bed platform 14 as shown in FIG. 9. Again, a recess or a pin and hole combination can be used in order to more properly secure the engagement between the first bed platform 14 and the rack 76. The first bed platform 14 can thus be reconfigured into a vertical orientation when placed in the transport configuration and be appropriately secured during transport. In a similar manner, the second bed platform 16 can be oriented from the folded position in the travel configuration into the vertical position in the transport configuration. The arrangement and features of the second bed platform 16 can be similar to those previously discussed with respect to the first bed platform 14 and a repeat of these characteristics is not necessary.

Once the bed platforms 14 and 16 have been oriented into the transport configuration an enlarged transport area 56 is formed in the travel trailer 10. The transport area 56 can be large enough to hold an all terrain vehicle (ATV) 58 so that one may transport the ATV 58 to a desired location. Additionally, the travel trailer 10 may be make light enough so that once arriving at a staging location one may hook the travel trailer 10 up to the ATV 58 so that the travel trailer 10 can be transported to a desired area inaccessible to the towing vehicle. The detachable pivot connection 42 can be released so that the step 38 is removed from the rear cross-member 36. Removal of step 38 allows the transport area 56 to be more easily accessed. The first bed platform 14, second bed platform 16 and vertical corner posts 28 form a generally open framework so that wind resistance is minimized when transporting the travel trailer 10 in the transport configuration.

Figure 10A:
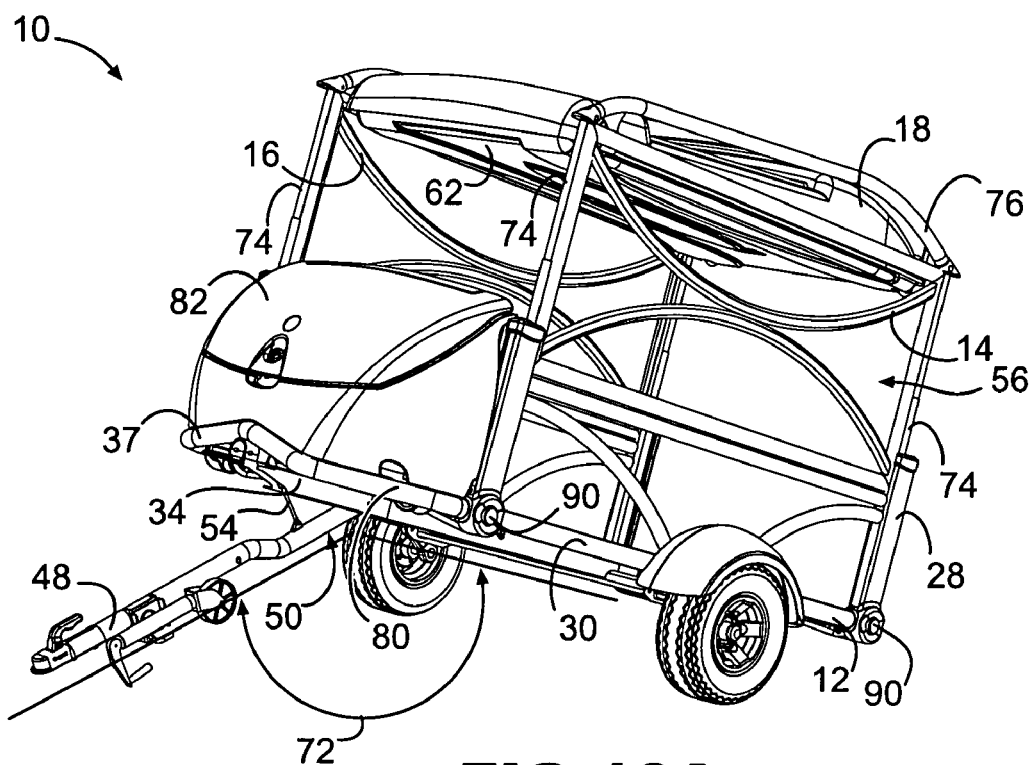
FIG. 10A is a perspective view of a travel trailer in the transport configuration that is tilted in order to assist in the loading of a vehicle in accordance with one exemplary embodiment.
Figure 10B:
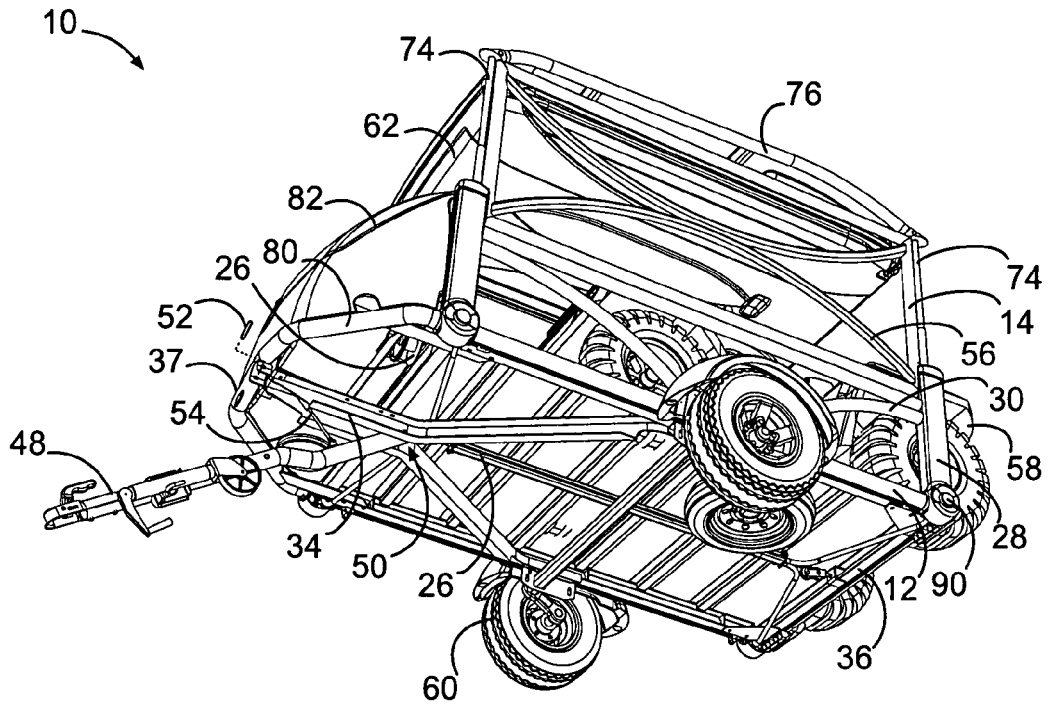
FIG. 10B is a bottom perspective view of the travel trailer of FIG. 10A.

The travel trailer 10 can be arranged with certain features to allow the ATV 58 to be more easily loaded and unloaded therefrom. The travel trailer 10 can be provided with a hinge connection 50 in accordance with one exemplary embodiment. The hinge connection 50 is located between the wheels 60 of the travel trailer 10 and the connection point to the towing vehicle. The hinge connection 50 is shown in a non-actuated position in FIGS. 1 and 3 in which the travel trailer 10 is in the travel configuration. As shown in FIG. 10A and FIG. 10B, the hinge connection 50 can be used to modify an angle 72 between the floor 24 and the hitch 48. In this regard, the hinge connection 50 has a pin 52 that can be removed in order to allow the hitch 48 to rotate with respect to the yoke 34. Any type of hinge connection 50 can be used to allow the hitch 48 and yoke 34 to pivot. The hinge connection 50 may be made through the use of bushings or springs or may be made without an extra component such that the yoke 34 and hitch 48 are connected in such a manner that they can integrally pivot with respect to one another. A damper 54 can be connected to the hitch 48 and to the frame 12 so that upon the removal of pin 52 the hitch 48 and yoke 34 do not uncontrollably pivot. The damper 54 thus allows for a slower rate of pivoting to be realized between the hitch 48 and yoke 34 so that damage to the travel trailer 10 or items proximate thereto does not occur.

Figure 11:
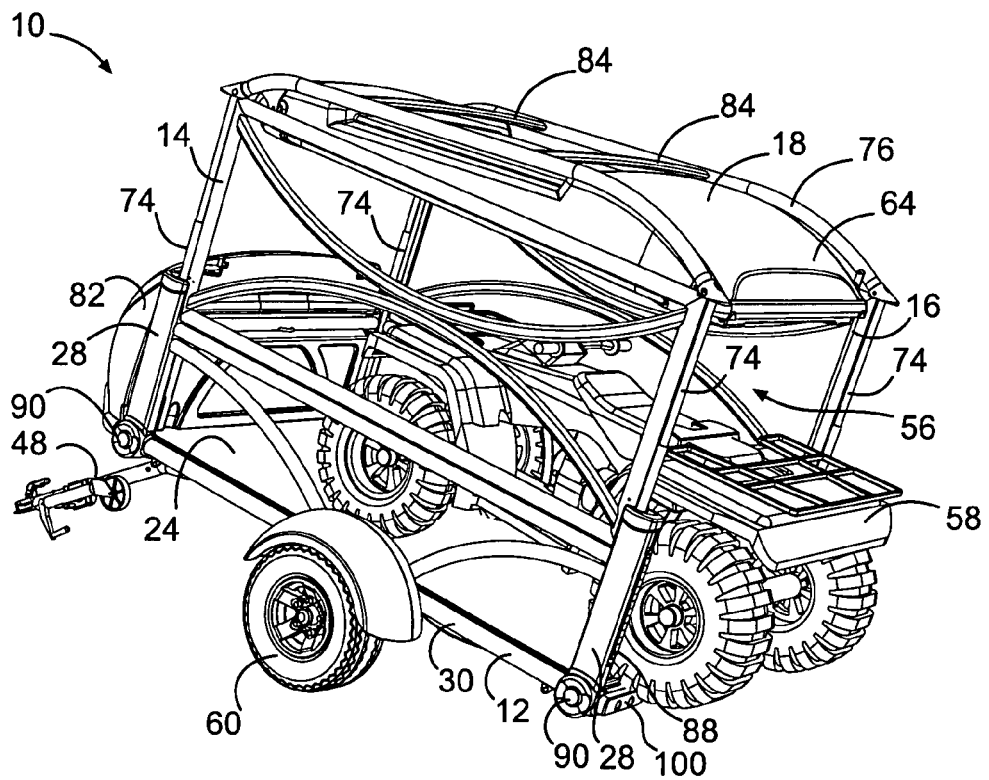
FIG. 11 is a back perspective view of the travel trailer of FIG. 10A in which an all terrain vehicle is being loaded thereon.
Figure 12:
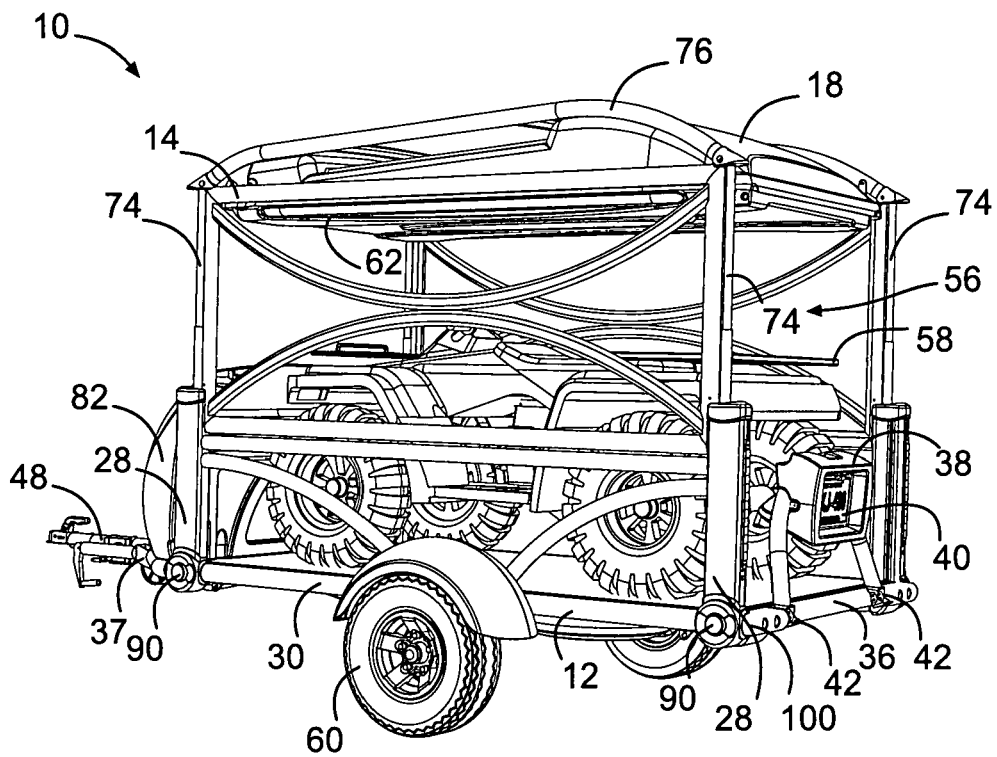
FIG. 12 is a back perspective view of the travel trailer of FIG. 10A in which the travel trailer is not tilted and an all terrain vehicle is loaded thereon for transport.

The hinge connection 50 can be actuated so that the angle 72 is reduced from the non-actuated position. In accordance with various exemplary embodiments, angle 72 may be from 120° to 175° when hinge connection 50 is actuated. The travel trailer 10 can be positioned as shown in FIG. 11 so that the rear cross-member 36 is touching or is in close proximity to the ground. Consequently, the floor 24 is positioned within close proximity to the ground so that the object 58 (ATV) can be easily driven thereon. Without this feature it may be necessary to lift the ATV 58 onto the floor 24 or position ramps or other lifting devices proximate to floor 24 in order to load the travel trailer 10. ATV 58 can be moved along floor 24 until a sufficient amount of weight is located forward of the wheels 60. At this time, the floor 24 will begin to pivot with respect to the hitch 48 so that the angle 72 increases. The hinge connection 50 will thus return to its original, non-actuated position as shown in FIG. 12 with the ATV 58 fully loaded into the transport area 56. The damper 54 will likewise act to slow and control the pivoting of hinge connection 50 when the weight of ATV 58 causes the hinge connection 50 to return to the non-actuated orientation.

The hinge connection 50 can be actuated when the travel trailer 10 is attached to the towing vehicle. As such, the floor 24 can be pivoted with respect to the hitch 48 so that its end is proximate to or touching the ground in order to aid in the loading of objects 58 such as the ATV 58. As such, the travel trailer 10 need not be removed from the towing vehicle in order to pivot the floor 24 with respect to the hitch 48 to position the floor 24 so as to aid in loading ATVs 58 thereon. The hitch 48 may remain in an orientation essentially parallel to the ground while the floor 24 is pivoted into the desired position. Once loaded, the pin 52 can be reinserted into the hinge connection 50 in order to lock the hinge connection 50 and prepare the travel trailer 10 for transport. In order to unload the ATV 58 from the transport area 56, the pin 52 can once again be removed in order to pivot the floor 24 with respect to the hitch 48 so that the floor 24 is located proximate to the ground to assist in removal of the ATV 58. The floor 24 can be pivoted to allow the ATV 58 to be unloaded while the hitch 48 remains attached to the towing vehicle. As such, the hinge connection 50 is arranged so that the hitch 48 does not need to be removed from the towing vehicle during loading and unloading of the ATV 58. Although not shown, once the ATV 58 is loaded onto the travel trailer 10 the detachable pivot connection 42 can be reattached to the rear cross-member 36 to attach the step 38 so that the license plate 40 is displayed to other drivers. Also, the step 38 can be further secured to the frame 12, bed platforms 14 and 16, or to the telescoping members 74 to act as a gate to prevent the ATV 58 from falling out of the travel trailer 10 during transport. However, other means, such as tie downs, of preventing the ATV 58 from falling out of travel trailer 10 may be employed so long as appropriate procedures are followed by the operator.

Figure 13:
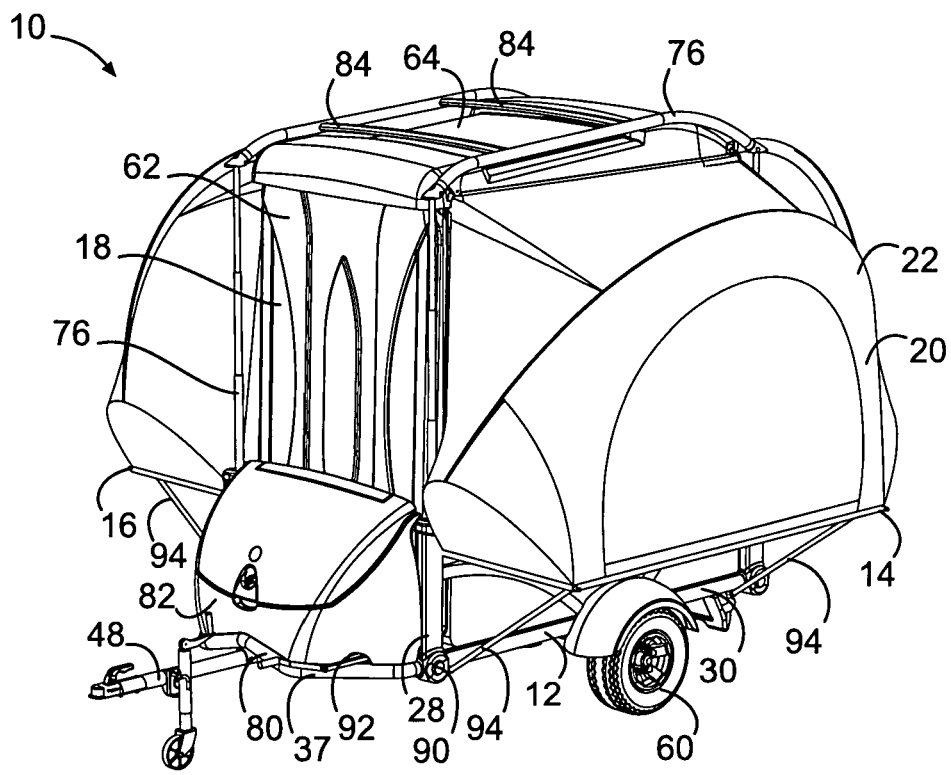
FIG. 13 is a perspective view of a travel trailer in a camping configuration in accordance with one exemplary embodiment.
Figure 14:
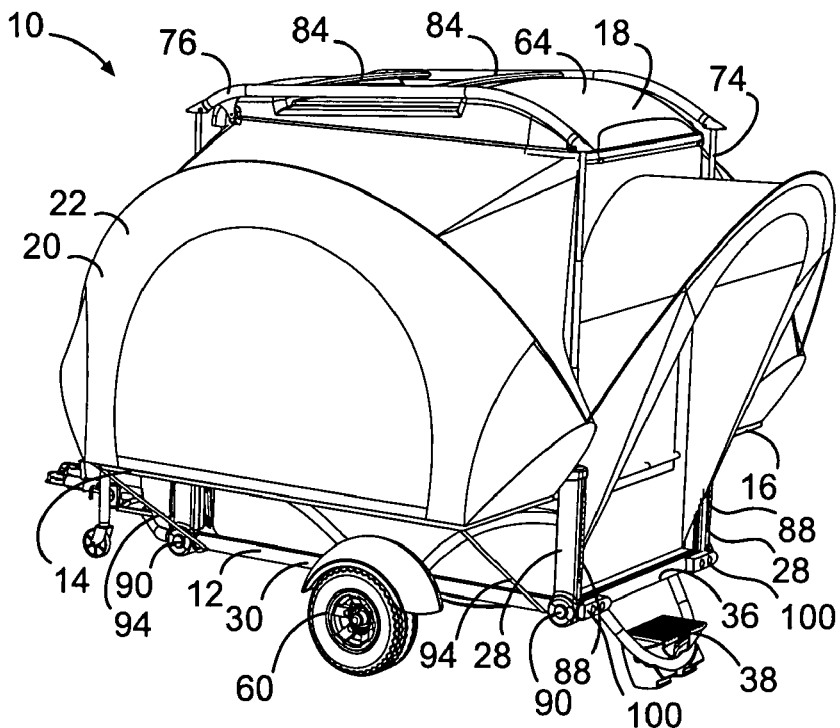
FIG. 14 is a back perspective view of the travel trailer of FIG. 13.

The travel trailer 10 can also be configured into a camping configuration in which tent fabric 20 is deployed on the travel trailer 10 in order to form a tent 22 to provide shelter. The travel trailer 10 is oriented into the camping configuration in FIGS. 13 and 14. In order to place the travel trailer 10 into the camping configuration from the transport configuration, the lifting mechanism 26 is actuated in order to raise the camping pod 18 so that it no longer engages the first and second bed platforms 14 and 16. The first and second bed platforms 14 and 16 can then be folded outwards so that they are located generally outside of the footprint of frame 12. Bed platform supports 94 can engage the bed platforms 14 and 16 and the frame 12 in order to hold the bed platforms 14 and 16 in a desired position. The bed platform supports 94 can fully support the bed platforms 14 and 16 in the positions shown or may be present in order to help support bed platforms 14 and 16. In this regard, the bed platforms 14 and 16 may be locked into the camping configuration position through interaction with the pins 104 that may limit their rotational orientation.

Figure 15:
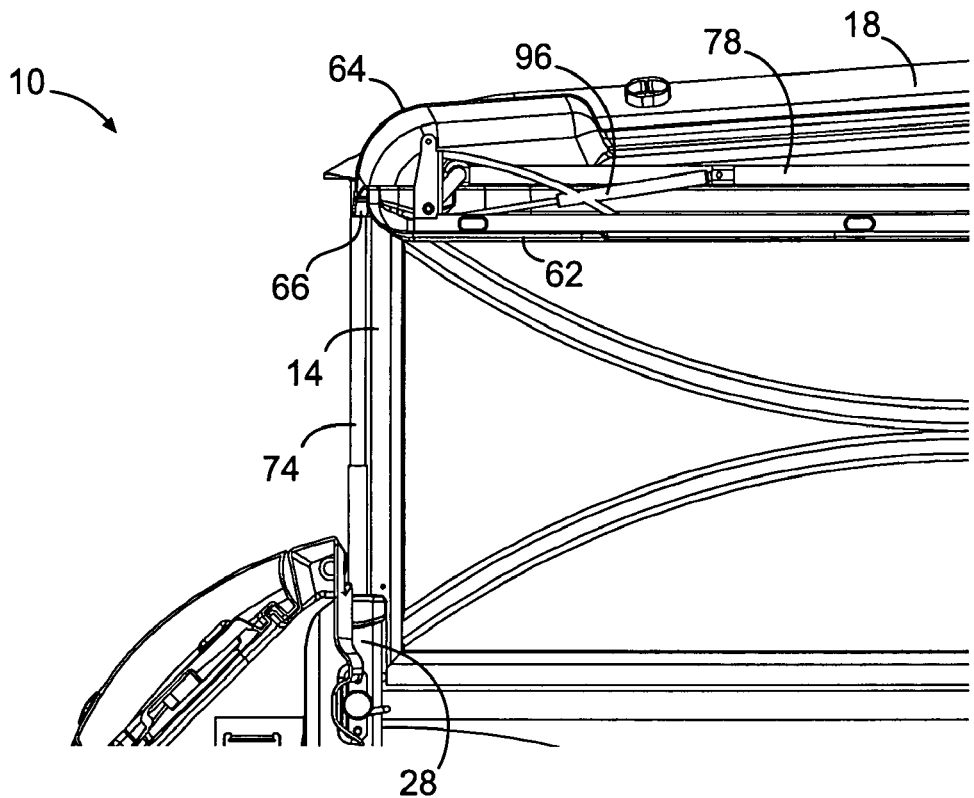
FIG. 15 is a detailed, side cross-sectional view of a travel trailer in the transport configuration in which the arrangement of the camping pod is illustrated in accordance with one exemplary embodiment.
Figure 16:
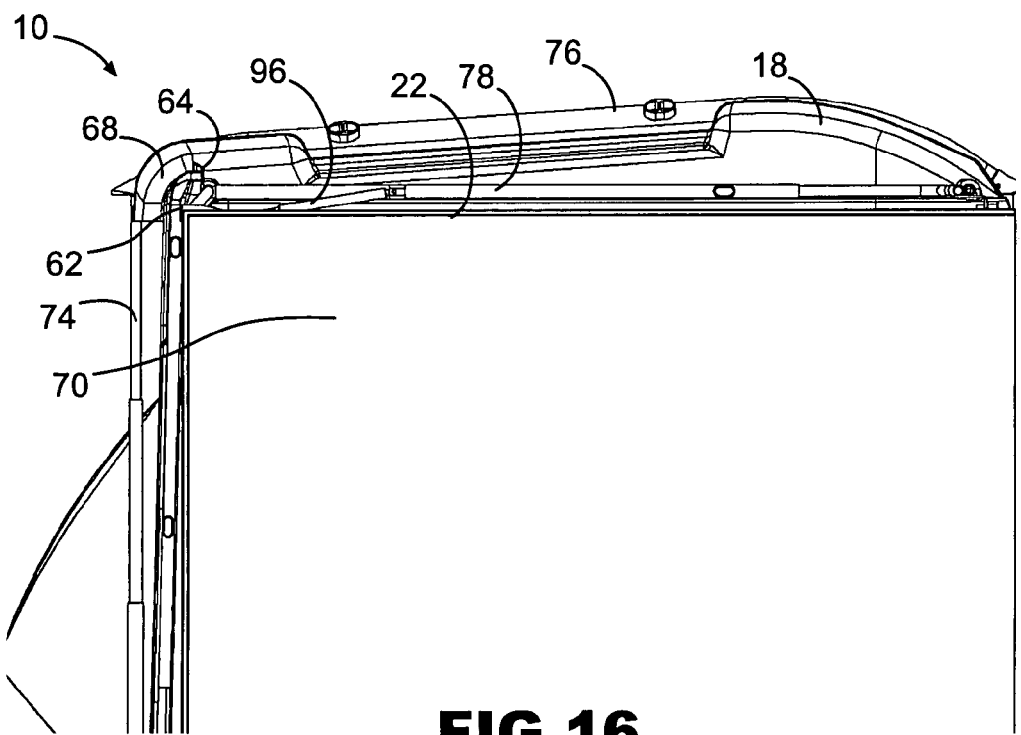
FIG. 16 is a detailed, side cross-sectional view of the travel trailer of FIG. 15 converted into the camping configuration in which the arrangement of the opened camping pod is illustrated.

After positioning the first and second bed platforms 14 and 16 into the camping configuration the step 38 may be rotated about the rear cross-member 36 in order to assist a user in entering and exiting the rear of the travel trailer 10. Also, the camping pod 18 can be opened in order to deploy the tent fabric 20 and form tent 22. The camping pod 18 can be a clamshell type component that has a bottom portion 62 and a top portion 64. FIG. 15 is a cross-sectional, detailed view of the travel trailer 10 in the transport configuration. The camping pod 18 has a bottom portion 62 that is hinged to the top portion 64 at approximately the front of the camping pod 18. The bottom portion 62 is arranged so that its engagement with the top portion 64 forms a seal 66 as shown for keeping water out of the camping pod 18 while driving down the road. The user may unlatch the camping pod 18 so that the bottom portion 62 swings downward while the top portion 64 remains held to and supported by the rack 76. This arrangement is shown in FIG. 16. Pivoting of the bottom portion 62 about the top portion 64 causes the seal 66 to be opened thus resulting in the formation of a vent 68 as shown. The vent 68 is advantageous in that it increases air flow into and out of the interior 70 of tent 22 when the travel trailer 10 is placed into the camping configuration. A section of tent fabric 20 can be present under the camping pod 18 so that mosquitoes and other bugs cannot find their way through vent 68 and into the interior 70 when camping.

Figure 17:
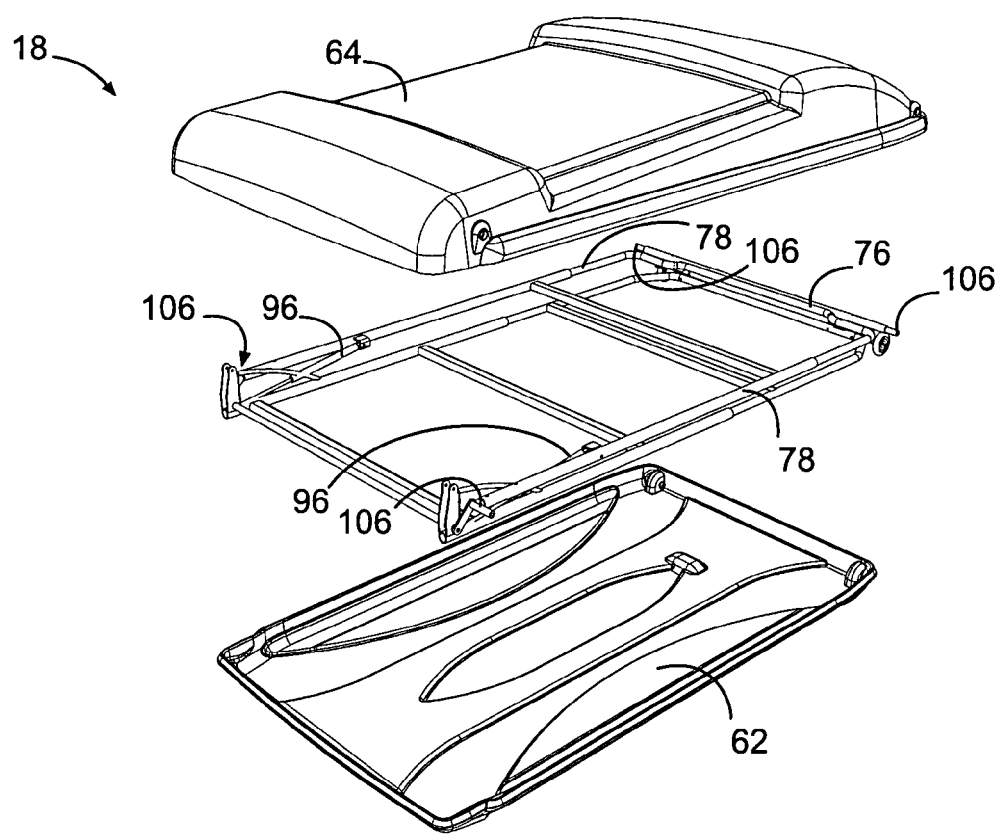
FIG. 17 is an exploded assembly view of a rack and camping pod in accordance with one exemplary embodiment.

The camping pod 18 may include a damper 96 that functions to control the lowering of the bottom portion 62 when opening the camping pod 18. The damper 96 thus prevents the bottom portion 62 from potentially falling suddenly and injuring the user, breaking, or causing damage to items in the travel trailer 10. FIG. 17 shows an exploded assembly view of the camping pod 18 and the rack 76. The camping pod 18 also includes a telescoping component 78 to account for variations in thermal expansion and contraction of connected components. For example, if made of a plastic material the camping pod 18 may expand and contract at a different rate than the rack 76, which may be made of aluminum, in response to temperature variations. Engagement between the rack 76 and camping pod 18 can be effected through the telescoping component 78 that allows them to slide or move with respect to one another. As such, lengthwise expansion or contraction of the camping pod 18 at a different rate than the rack 76 can be accommodated through movement of the telescoping component 78 so that neither of these parts becomes distressed upon expansion or contraction at different rates. The camping pod 18 is mounted onto the rack 76 by way of pins 106. Space can be provided along the pins 106 so that upon expansion and contraction of the rack 76 and camping pod 18 at different rates the relative position of the camping pod 18 along the pins 106 can be varied. The space provided by pins 106 therefore accommodates widthwise variations between different rates of thermal expansion and contraction of the camping pod 18 and the rack 76.

Figure 18:
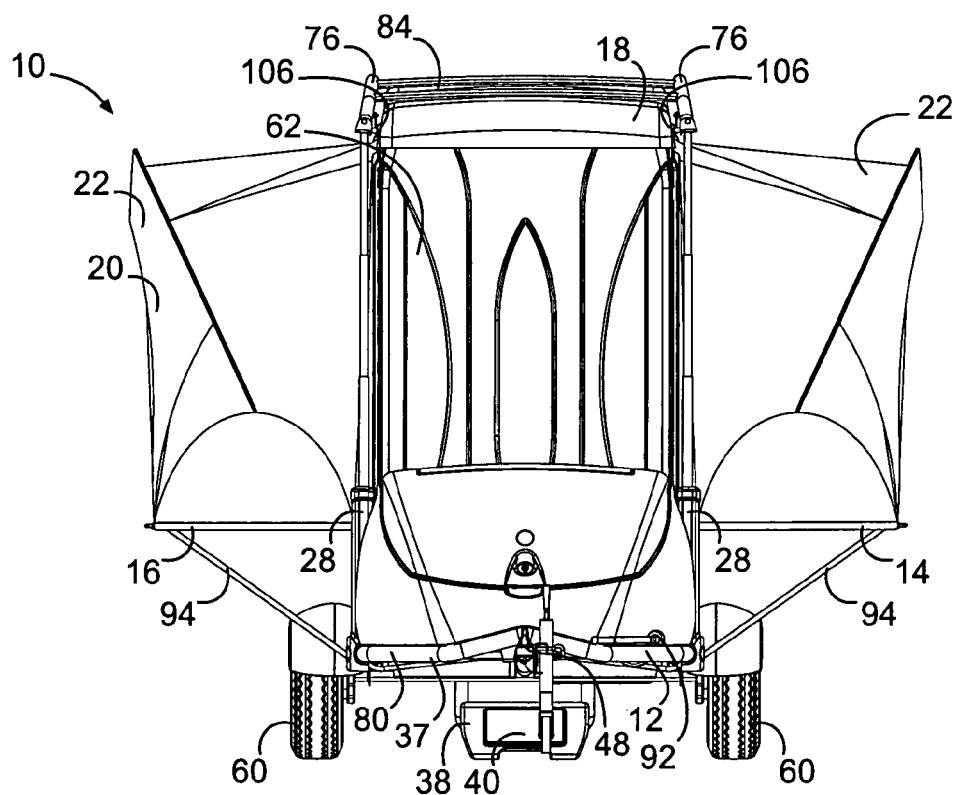
FIG. 18 is a front view of the travel trailer of FIG. 13.
Figure 19:
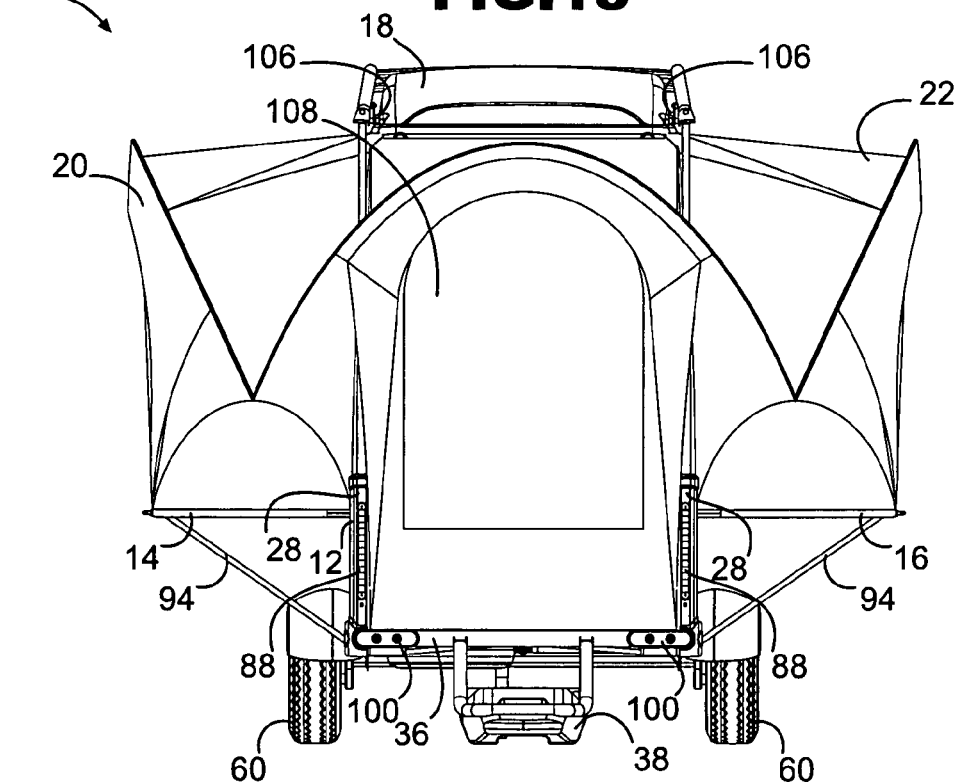
FIG. 19 is a back view of the travel trailer of FIG. 13.

The camping pod 18 is opened when forming the tent 22. The bottom portion 62 of the camping pod 18 becomes the front wall of the tent 22, as shown in FIG. 18, when the camping pod 18 is opened. The bottom portion 62 can be held in place through mechanical fasteners or through some other mechanism to the floor 24 or frame 12 in various exemplary embodiments. Other embodiments exist in which the bottom portion 62 simply pivots downward and remains in the vertical position unlatched until pulled back up by the user. As shown in FIG. 19, the tent 22 is arranged so that a door 108 is located on the rear of the travel trailer 10 to allow a user to gain access to the interior 70 of the tent 22. The door 108 may be opened by unzipping a zipper in the tent fabric 20. Additionally or alternatively, latches or hook and loop type fasteners can be used to open and close the door 108. Access to and from the interior 70 is thus gained through the rear of the travel trailer 10. However, other embodiments are also possible in which access to the interior 70 can be gained through the front or through one or more of the sides of the tent 22. The step 38 is positioned in the camping configuration so that it is located generally beneath the door 108 to assist a user in entering and exiting the interior 70.

Figure 20:
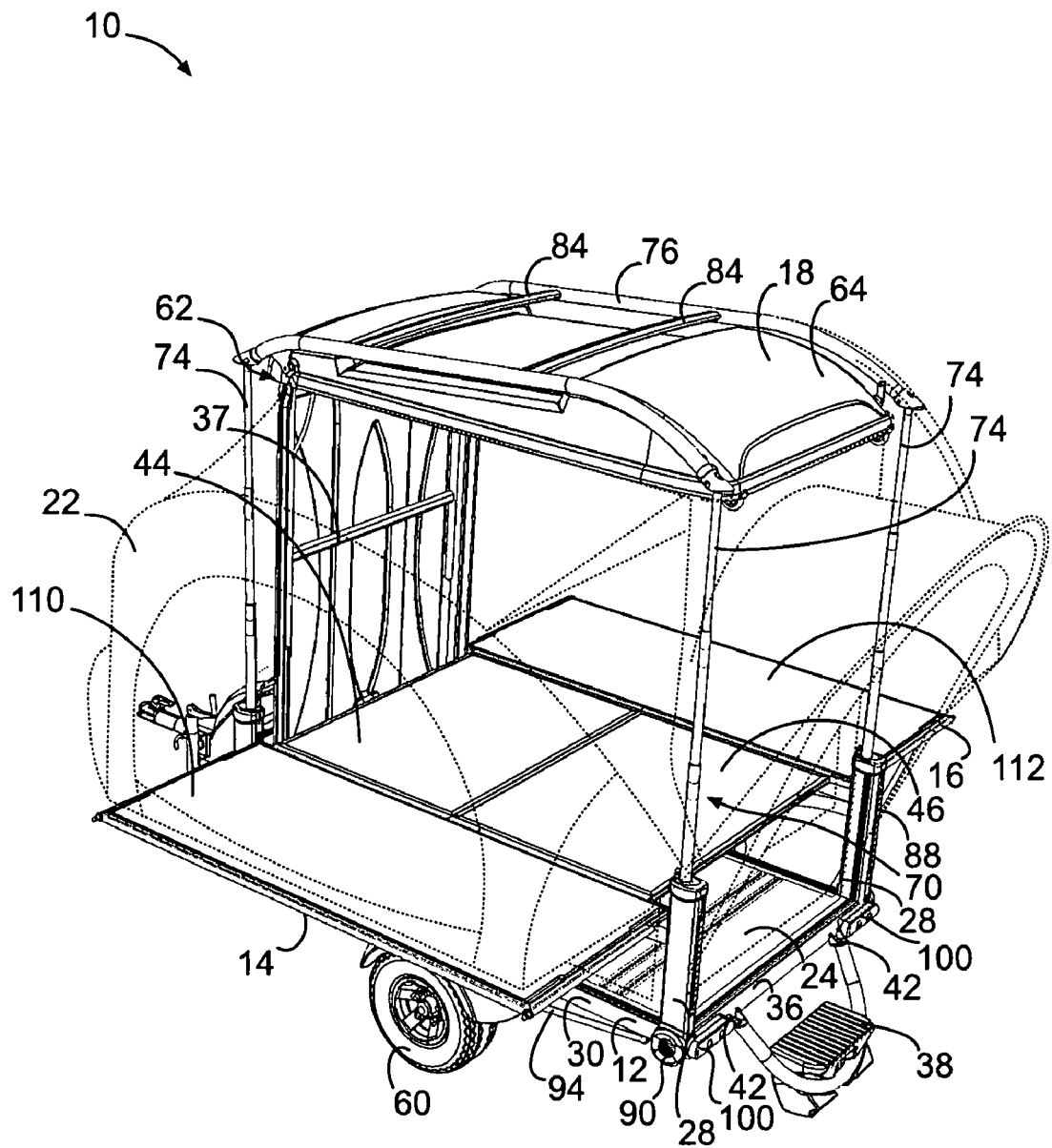
FIG. 20 is a perspective view of the interior of a tent formed by the travel trailer when in the camping configuration in accordance with one exemplary embodiment.

FIG. 20 shows the interior 70 of tent 22. Tent fabric 20 is positioned over the first and second bed platforms 14 and 16 in order to increase the volume of interior 70. Bed panels 110 and 112 can be placed onto the first and second bed platforms 14 and 16 in order to form beds onto which users may rest or sleep. The bed panels 110 and 112 can be stored in the camping pod 18 and may unfold with tent fabric 20 when the tent 22 is formed so that they are moved on top of the first and second bed platforms 14 and 16. Alternatively, the bed panels 110 and 112 can be stored at another location in the travel trailer 10 and placed onto the bed platforms 14 and 16 when constructing the tent 22. For example, the bed panels 110 and 112 can be located underneath the camping pod 18 and can be removed from this location and placed onto the bed platforms 14 and 16 before the camping pod 18 is opened. In other arrangements, the bed panels 110 and 112 can be located in the camping pod 18 and manually removed once the bottom portion 62 is moved into the vertical position to form the front wall of the tent 22. Although not shown, windows can be located in the tent fabric 20 to allow viewing out of the front side of the tent 22. Additionally or alternatively, one or more windows may be located in the tent fabric 20 above the first and second bed platforms 14 and 16 to allow a user to gaze at the stars while resting on the bed platforms 14 and 16.

A pair of interior bed panels 44 and 46 can also be included. The interior bed panels 44 and 46 can be located underneath the camping pod 18 when the travel trailer 10 is in the travel or transport configurations. In the camping mode, the interior bed panels 44 and 46 can be detached from the rack 76, camping pod 18, or other member to which they are attached and placed into a desired position. The interior bed panels 44 and 46 can be located above the floor 24 of the travel trailer 10 at the same height as the bed panels 110 and 112 to form a single, large sleeping surface. Alternatively, the bed panels 44 and 46 can be located above the floor 24 at a height greater than the bed panels 110 and 112 in order to form a table. In this regard, users may sit on the bed panels 110 and 112 and use bed panels 44 and 46 as a table surface for eating or playing cards. Ends of the bed panels 44 and 46 can hook onto or otherwise be supported by a front frame component 37 of the frame 12. Legs can be provided on the underside of the bed panels 44 and 46 in order to be supported along their length. Further, the sides of the bed panels 44 and 46 can be supported by the first and second side frame components 30 and 32 or may be supported by portions of the frame 12. The bed panels 44 and 46 can be adjusted and positioned in a variety of manners, as desired, in order to selectively arrange the interior 70 of the tent 22.

The tent fabric 20 can be supported by the frame 12. In this regard, the tent fabric 20 may be attached to the frame 12 or may be unattached to the frame 12 which still supports the tent fabric 20 since it supports the camping pod 18 and/or telescoping members 74 which in turn support the tent fabric 20. As such, the frame 12 supports the tent fabric 20 in that it functions to hold the tent fabric 20 in a particular position. As such, when used herein the support that the frame 12 provides to the tent fabric 20 is understood to be used in the broadest sense and does not require actual contact, locking, covering or overlapping of these components. Although not shown, the frame 12 can include one or more legs that are deployed when the travel trailer 10 is placed into the camping configuration. The legs can be used to help provide stability to the tent 22. The travel trailer 10 may include components that are made of a variety of materials. For example, the rack 76 may be made of aluminum in accordance with one exemplary embodiment. Additionally, bed platforms 14 and 16, the side frame components 30 and 32, the vertical corner posts 28, and the rear cross-member 36 may also be made of aluminum. The yoke 34 and hitch 48 can be made of steel in accordance with certain exemplary embodiments.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A travel trailer, comprising:
   a first bed platform;
   a second bed platform, wherein the first bed platform and the second bed platform are capable of being positioned in a travel configuration and in a camping configuration; and
   a camping pod capable of being positioned in a travel configuration and in a camping configuration, wherein the camping pod is located above the first bed platform and the second bed platform when the first bed platform and the second bed platform are positioned in the travel configuration, wherein the camping pod has a top portion and a bottom portion and tent fabric is located between the top portion and the bottom portion.

2. The travel trailer as set forth in claim 1, further comprising:
   a first side frame component; and
   a second side frame component, wherein the first bed platform is capable of pivoting at least one hundred eighty degrees with respect to the first side frame component between the travel configuration and the camping configuration, and wherein the second bed platform is capable of pivoting at least one hundred eighty degrees with respect to the second side frame component between the travel configuration and the camping configuration.

3. The travel trailer as set forth in claim 2, wherein the first bed platform and the second bed platform are capable of being positioned in a transport configuration, wherein the first bed platform is capable of pivoting at least ninety degrees with respect to the first side frame component between the travel configuration and the transport configuration, and wherein the second bed platform is capable of pivoting at least ninety degrees with respect to the second side frame component between the travel configuration and the transport configuration.

4. The travel trailer as set forth in claim 1, further comprising:
   a floor, wherein the camping pod is vertically moved away from the floor during reconfiguration from the travel configuration to the camping configuration; and
   a rack configured to support the camping pod, wherein the camping pod has a different rate of thermal expansion than the rack, wherein the rack has a telescoping component configured to accommodate varying rates of thermal expansion between the camping pod and the rack.

5. The travel trailer as set forth in claim 4, further comprising a telescoping lifting mechanism used to vertically move the camping pod away from the floor and closer to the floor.

6. The travel trailer as set forth in claim 1, further comprising:
   a frame that carries the first bed platform and the second bed platform; and
   a step removably attachable to the frame, wherein the step is configured for carrying a license plate, wherein the step is capable of being oriented with respect to the frame to allow a user to step on the step to assist in gaining access to an interior of the travel trailer.

7. The travel trailer as set forth in claim 1, wherein the first bed platform and the second bed platform at least partially overlay one another and are in different planes when in the travel configuration, wherein the first bed platform and the second bed platform lie in the same plane when in the camping configuration.

* * * * *